(12) United States Patent
Malone

(10) Patent No.: US 7,340,673 B2
(45) Date of Patent: Mar. 4, 2008

(54) SYSTEM AND METHOD FOR BROWSER DOCUMENT EDITING

(75) Inventor: Daniel R. Malone, Beverly, MA (US)

(73) Assignee: VistaPrint Technologies Limited, Hamilton (BM)

( * ) Notice: Subject to any disclaimer, the term of this patent is extended or adjusted under 35 U.S.C. 154(b) by 923 days.

(21) Appl. No.: 10/230,745

(22) Filed: Aug. 29, 2002

(65) Prior Publication Data

US 2004/0044966 A1    Mar. 4, 2004

(51) Int. Cl.
*G06F 15/00* (2006.01)

(52) U.S. Cl. .................. 715/255; 715/234; 715/256; 715/269

(58) Field of Classification Search ............. 715/513, 715/542, 530–531, 234, 255, 256, 269
See application file for complete search history.

(56) References Cited

U.S. PATENT DOCUMENTS

| | | | |
|---|---|---|---|
| 5,499,366 A * | 3/1996 | Rosenberg et al. ............ 707/4 |
| 6,012,075 A * | 1/2000 | Fein et al. .................... 715/540 |
| 6,247,011 B1 * | 6/2001 | Jecha et al. .................... 707/9 |
| 6,542,170 B1 * | 4/2003 | Williams et al. ............. 715/816 |
| 6,589,292 B1 * | 7/2003 | Langford-Wilson ......... 715/517 |
| 6,832,351 B1 * | 12/2004 | Batres ........................ 715/505 |
| 2002/0057454 A1 * | 5/2002 | Ueda et al. ................ 358/1.15 |
| 2002/0073125 A1 * | 6/2002 | Bier ............................ 707/530 |
| 2002/0083103 A1 * | 6/2002 | Ballance et al. ........... 707/536 |
| 2002/0161805 A1 * | 10/2002 | Harris ........................ 707/530 |
| 2002/0188636 A1 * | 12/2002 | Peck et al. .................. 707/530 |
| 2003/0066032 A1 * | 4/2003 | Ramachandran et al. ... 715/513 |
| 2003/0101235 A1 * | 5/2003 | Zhang ........................ 709/218 |
| 2003/0128234 A1 * | 7/2003 | Brown et al. ............... 345/744 |
| 2003/0149935 A1 * | 8/2003 | Takizawa et al. ........... 715/513 |
| 2003/0233620 A1 * | 12/2003 | Vedullapalli et al. ....... 715/522 |
| 2004/0021699 A1 * | 2/2004 | Fildebrandt ................. 345/854 |
| 2004/0153974 A1 * | 8/2004 | Walker ....................... 715/531 |
| 2004/0205666 A1 * | 10/2004 | Poynor ....................... 715/531 |

FOREIGN PATENT DOCUMENTS

WO    WO 01/42972 A2    1/2001

OTHER PUBLICATIONS

Anderson et al., Editing a Web Site: Extending the Levels of Edit, Mar. 1998, IEEE Transactions on vol. 41, Issue 1, pp. 47-57.*
Ono et al., XSLT Stylesheet Generation by Example with WYSIWYG Editing, Applications and the Internet 2002, Proceedings 2002 Symposium on 2002, pp. 1-10.*
PCT Search Report, May 28, 2004, VistaPrint.

* cited by examiner

*Primary Examiner*—Doug Hutton
*Assistant Examiner*—Chau Nguyen
(74) *Attorney, Agent, or Firm*—Robert L. Dulaney

(57) ABSTRACT

Method, system and computer code for editing text in a document displayed in a World Wide Web browser. User edit requests intended to modify a font parameter of one or more characters within a text box are replaced by a predefined substitute edit request prior to updating of the document DOM. The DOM is then accessed and modified appropriately to remove the DOM components related to the substitute edit and insert the appropriate components to achieve the requested edit.

16 Claims, 6 Drawing Sheets

SYSTEM AND METHOD FOR BROWSER DOCUMENT EDITING

FIELD OF THE INVENTION

This invention relates generally to the editing of a computer document and more specifically to the editing and displaying of a document using a Web browser.

BACKGROUND OF THE INVENTION

Software applications designed to locate and display World Wide Web ("Web") pages are in widespread use. Commonly referred to as Web browsers, two of the most popular of such applications are Internet Explorer from Microsoft Corporation and Netscape Navigator from Netscape Communications Corporation. These browsers are capable of displaying documents written in the common markup languages in use today.

HTML (Hypertext Markup Language) remains a very common and popular authoring and presentation language for creating Web materials. The HTML standard was originally established with the idea that an HTML document would remain static after being rendered in the browser. To allow for elements in an HTML page to be controllable after the page is rendered, a DHTML (Dynamic HTML) standard was developed. DHTML is not actually a language, but is the combination and interaction of several Web-related standards, including HTML, CSS (Cascading Style Sheets), DOM (Document Object Model), and scripting. The DOM is an interface in the browser that allows programs to access and change the content, structure and style of documents. Any changes are dynamically incorporated back into the page and displayed to the user.

Another development has been the creation of the XML (eXtensible Markup Language) standard. XML is also not a language, but is a metalanguage or set of rules that allow the creation of other markup languages. XML allows developers to create markup languages that are more versatile and powerful than HTML. One of the standard XML languages that are now in common use is XHTML (eXtensible HTML). The XHTML language standard was developed by adapting the existing HTML standard to meet the requirements of XML. The DHTML standard also now accommodates XHTML. Specifications and descriptions for HTML, XML, XHTML, DOM and other Web-related open technology standards are available on the Web from the World Wide Web Consortium at http://www.w3c.org.

Many enterprises have recognized the commercial opportunities that are presented by the ability to create and edit documents in the browser and have undertaken to capitalize on it by developing products and services supported or enabled by software applications running in the browser. To facilitate and promote the development of browser-compatible software applications, browser vendors typically implement and make readily available an API (application program interface) of standard routines, protocols and tools for use by application developers.

XHTML documents, like HTML documents, are constructed as a collection of discrete elements, each element being marked with opening and closing tags and having associated parameters. A common text-formatting element is the "division", or DIV, element. A document level DIV element would typically contain multiple additional DIV elements defining the various components that comprise the document. One or more of these elements could contain fixed design features of the document, such as standard text, a logo, or a background graphic, that are not intended to be editable by the user. Additional predefined DIV elements could be initially empty of content and available to be customized by the user with the user's informational input.

All elements would have a set of parameters established by the document designer to define the initial structure and content of the element. These include both the physical features of the element, such as the absolute or relative spatial location of the element within the document, as well as the attributes to be applied to any user text content entered in the element, such as font type, font size, font color, and any font attributes such as bolding and italics. The document could also be designed to allow the user to reposition one or more of the elements by conventional click-and-drag techniques.

In designing an XHTML document, the browser allows the document designer to specify the size of the text in the DIV element in terms of either pixels or font tag sizes. For the preparation of many types of materials, the use of pixel sizes is superior because it allows an almost unlimited range of font sizes to be made available to users. Font tags, by contrast, are limited by XHTML standards to seven different sizes. Furthermore, font tag sizes do not indicate an absolute size, but rather merely a relative size in comparison to the other font tag sizes.

One shortcoming in the prior art that limits the ability of users to design documents in a browser is that browsers typically do not provide a full range of editing options for certain types of editing. As noted above, conventional XHTML document coding assigns text parameters such as font type, color and size at the level of the DIV element. In other words, conventional coding anticipates that all characters entered in a text field will be rendered in the same font, at the same font size, etc. One specific example of a browser limitation that hampers the usefulness of the browser for the creation of high quality printed materials is the manner in which the browser handles the editing of font sizes within a DIV element.

While the browser provides the technical capability to take editing actions inside a DIV element text string, such as inserting characters of a different size or modifying the size of one or more of the existing characters, the browser does not provide the capability to specify pixel sizes for the new or modified characters. When the font size of a part of a DIV element is changed, the browser will define the new size in terms of font tag sizes. Allowing this type of editing would have the effect of generating a text string defined partly in pixels and partly in font tags.

This inability to precisely control and match character sizes poses a significant problem for applications directed to providing "what you see is what you get" document design and printing services, such as a service where the user designs an XHTML document with the user's browser and uploads the document to the remote server of the printing service provider for conversion into a prepress format and eventual printing. Therefore, to avoid editing problems and incompatibilities, and the customer dissatisfaction that would result, companies that supply document editing and printing tools and services for use in creating documents in browsers have historically prohibited their customers from editing text within a DIV element.

Because the modern word processing and desktop publishing programs that are in widespread use today typically allow the user to control the display parameters for each individual text character, many users want and expect this level of editing control and are dissatisfied by the inability to edit on a character by character level. It would be very desirable for companies in the business of providing browser-based online document designing, editing and proofing services if their customers could have the ability to edit only a portion of a character string, for example by changing the color, size or the font of one or more characters or words within a longer string of text.

SUMMARY OF THE INVENTION

The invention addresses the above-identified shortcoming by providing a system and method that works with the DOM to enhance the document editing abilities of the browser. In one embodiment, an editing program running in the client browser contains computer code that is activated by certain edit requests from the user. The program supplies a substitute edit request to the browser in place of the request received from the user. The DOM is then accessed and edited to remove the portion of the DOM related to the substitute edit request and insert appropriate tags to achieve the original edit request.

An advantage of the invention is that multiple font sizes can be precisely specified within a single text element. Another advantage is that the use of a predetermined substitute edit request simplifies the revision of the DOM. Yet another advantage is that modifications to the DOM generation function of the browser are not required. Other invention features, advantages and applications will become apparent from the following figures and description.

DETAILED DESCRIPTION OF THE PREFERRED EMBODIMENT

The term "document" as used herein refers to an electronic file intended for eventual printing by any known printing process on any printable medium, including, but not limited to, paper, cloth, glass, plastic, rubber, or wood. For the purposes of illustration and discussion, the invention will be described in the context of a user engaged in the online design and development of a business card. It will be understood that the invention can be readily used with any type of application where there is a requirement or desire for modified or expanded browser editing functionality.

Figure 1:
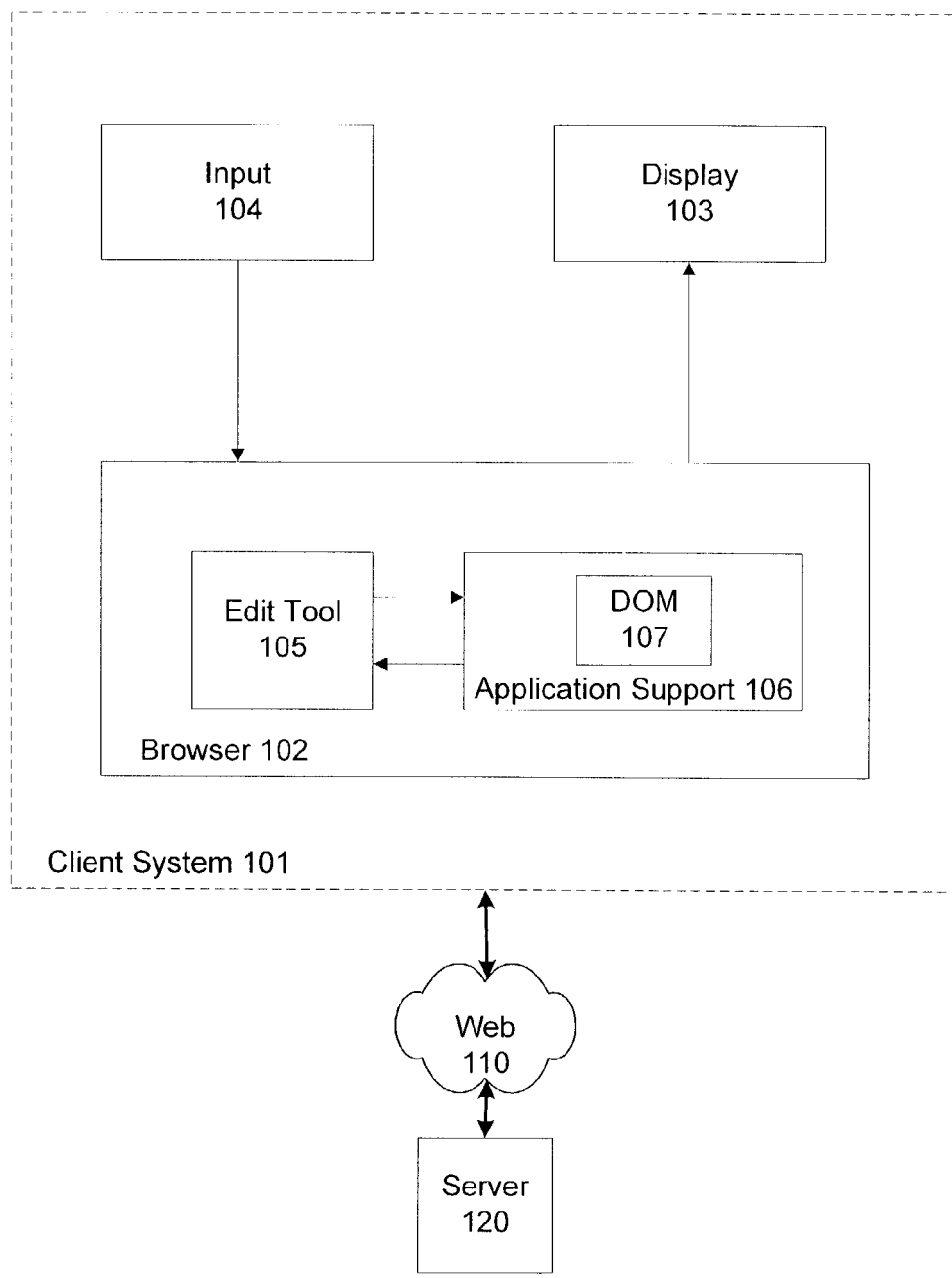
FIG. 1 shows a client system with which the invention may be employed.

FIG. 1 depicts a typical system with which the invention may be employed. Client System 101 represents a user's computer system, for example, a typically equipped modern personal computer being configured to communicate over the Web and running a modern Web browser program 102. For purposes of discussion, the invention will be described in the context of a personal computer running the Microsoft Internet Explorer browser, but it will be appreciated that the invention can be applied to other browser programs that support XHTML functionality and to other intelligent devices, such as PDAs capable of running such a browser.

Display 103 is the monitor of Client System 101 on which the document being designed is displayed for viewing by the user. Input 104 represents the means for the user to enter, edit, and position text in the document. In a typical system, Input 104 would be the keyboard and mouse of Client System 101. Edit Tool 105 runs in browser 102, receives text and command inputs from Inputs 104, and provides Application Support 106 with information about the text and commands such that Application Support 106 can generate the DOM describing the XHTML document and render the document for Display 103 for viewing by the user. Edit Tool 105 is written using the browser API such that Edit Tool 105 sends and receives information and data to and from Application Support 106 using standard browser commands. In a preferred embodiment, Edit Tool 105 is downloaded by the user via the Web 110 from remote Server 120, but Edit Tool 105 could also have been retrieved by the user over any type of network, from a disk or other storage medium available to the user, or from the internal memory of Client System 101.

One prior art system for performing browser-based document creation and editing is disclosed in U.S. Pat. No. 6,247,011 entitled "Computerized Prepress Authoring for Document Creation". U.S. Pat. No. 6,247,011 discloses a system wherein an HTML document editing tool is downloaded to the user's browser. Another system for browser-based document creation is described in co-pending and commonly owned application Ser. No. 09/557,571 entitled "Managing Print Jobs", which is hereby incorporated by reference. Neither system expressly discusses means for overcoming the problems related to edits that affect only a portion of an element.

Application Support 106 collectively represents all of the functions provided by the browser vendor within the browser that interface with, and provide support for, browser-compatible application programs. Application Support 106 includes the browser functions such as receiving commands and data from Edit Tool 105, generating and maintaining DOM 107, and rendering the document to be displayed on Monitor 103.

Figure 2:
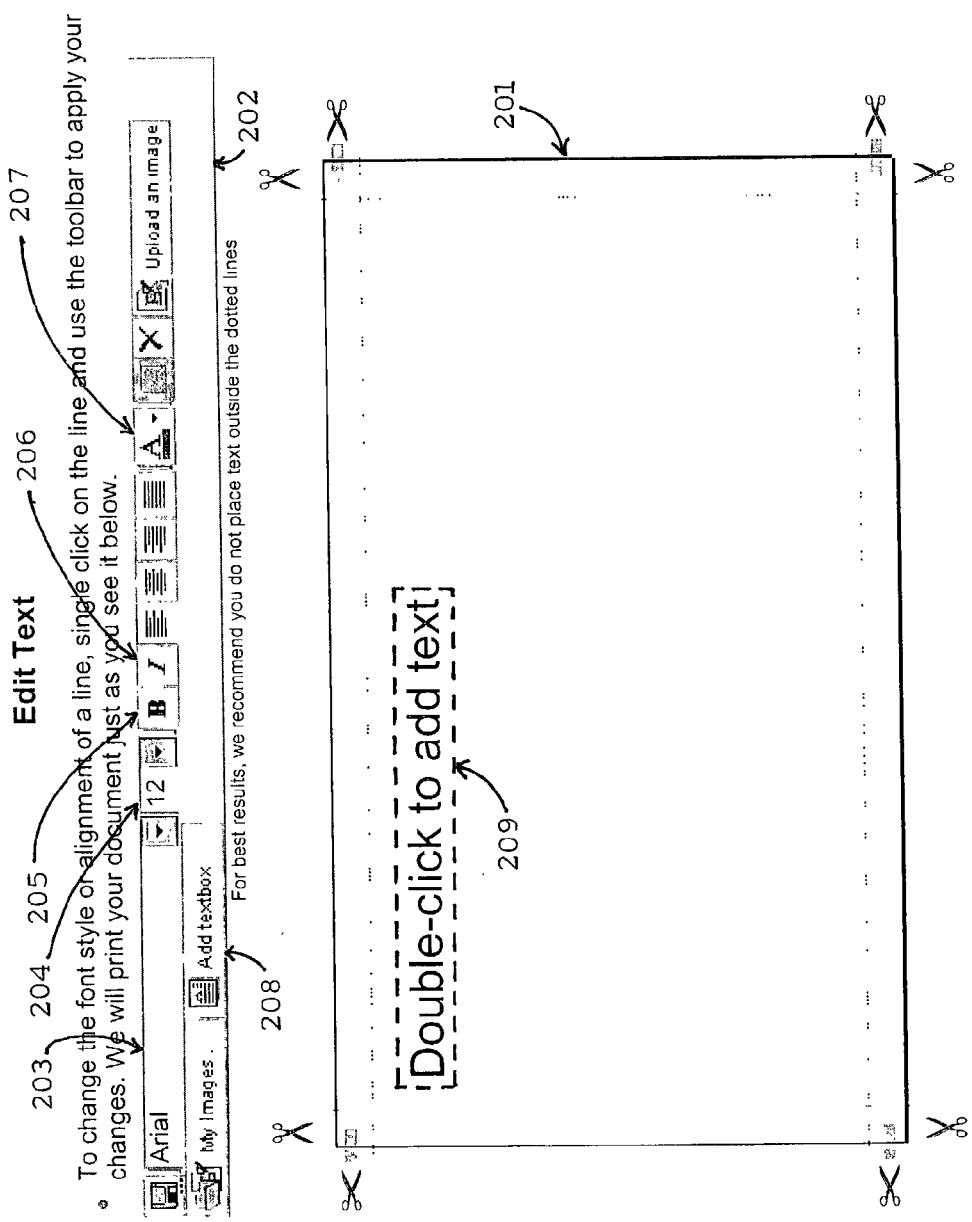
FIG. 2 shows template 201.

FIG. 2 is an example of a document-editing screen rendered on Display 103. The screen initially presents Template 201 and Edit Bar 202 to the user. Edit Bar controls the activation of various editing functions related to controlling text parameters, text justification, and the insertion in the document of preexisting user images. The controls that directly relate to editing of text within a text element include Font Type Menu 203, Font Size Menu 204, Bold button 205, Italics button 206 and Color Menu 207.

In this example, Template 201 represents a blank business card layout. The user can insert one or more text boxes into Template 201 using the Add textbox button 208. Clicking Add textbox 208 opens a new text box 209 that is initially filled with the phrase "Double-click to add text" to provide instruction to the user in the process for entering text in the field. The user can add, edit, and position within Template 201 as many textboxes as the user desires. When the user has completed entering all desired user information into Template 201 and is satisfied with the design, the user can upload the card to Server 120 and proceed to take additional actions, such as saving the business card design for later review or placing an order for the card to be printed Text boxes opened in template 201 have a set of initial parameters established by the template designer. For example, immediately after clicking Add textbox 208, the DIV element associated with text box 209 as shown in FIG. 2 is:

<DIV class=moveme id=text100 contentEditable=true style="DISPLAY: none; FONT-SIZE: 24 px; Z-INDEX: 22; LEFT: 35 px; COLOR: #000000; FONT- FAMILY: Arial; LETTER-SPACING: 0 px; POSITION: absolute; TOP: 35 px; WRITING-MODE: lr-tb">Double-click to add text</DIV>

ContentEditable is the attribute that notifies the browser that editing of this element is allowed. All other entries in the element are standard XHTML style elements describing the initial position and characteristics of the element. Each text box is assigned a unique identifier. While the user is presented with font sizes based on the point size system in Font Size menu 204, the actual XHTML element specifies the character size in the pixel equivalent. The initial text box is identified as id=text100. Additional text boxes opened in the document would be identified as id=text101, id=text102, and so forth.

Figure 3:
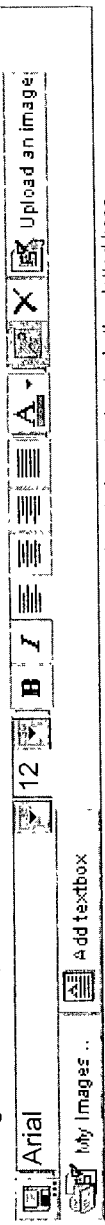
FIG. 3 shows template 201 after initial entry of text.
Figure 3:
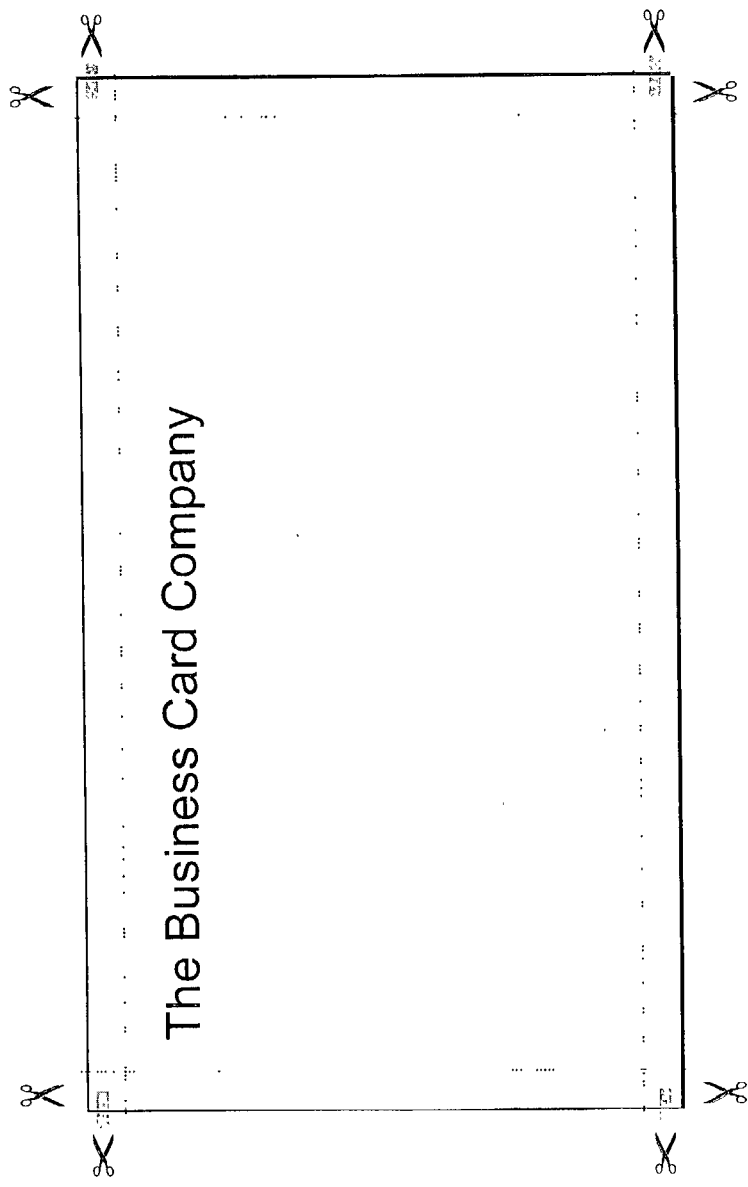
Figure 4:
FIG. 4 shows template 201 after a first editing operation.
Figure 4:
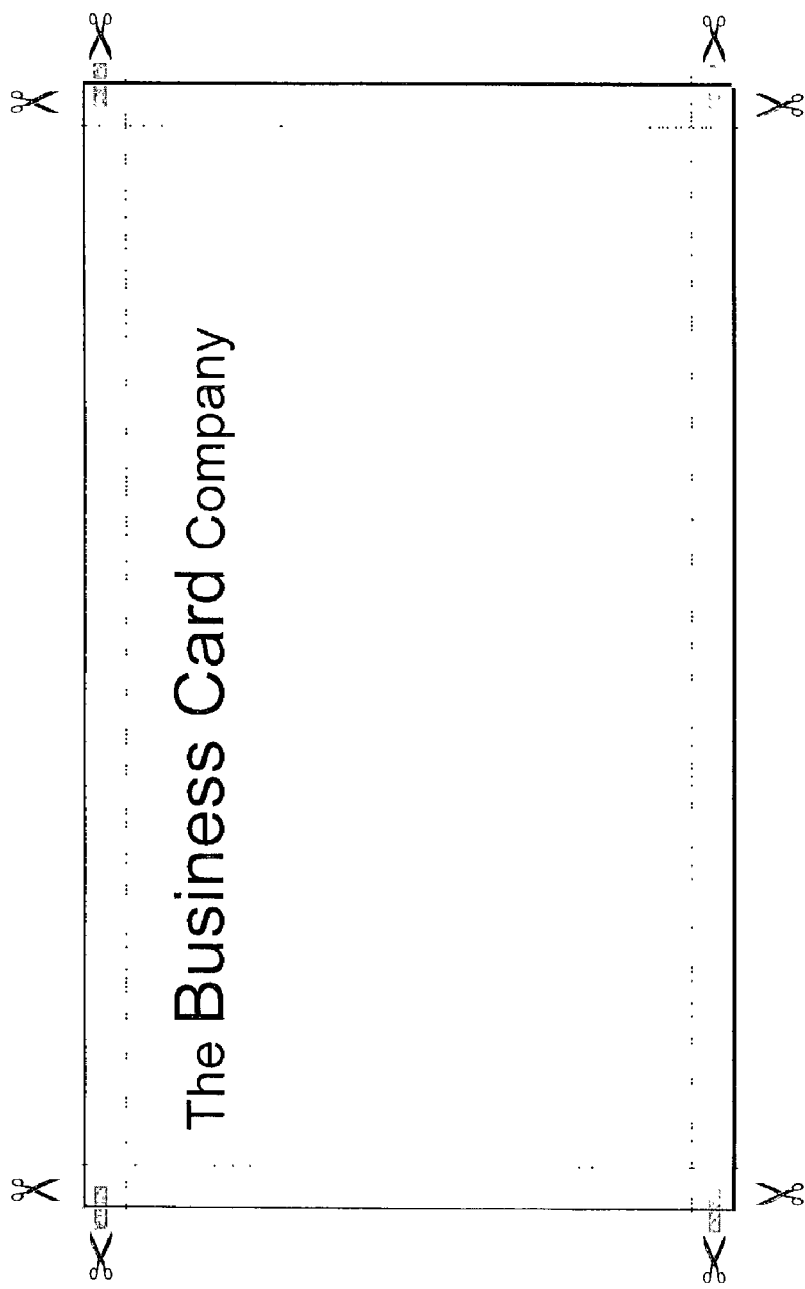
Figure 5:
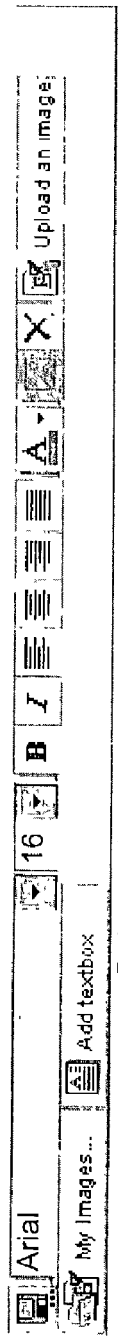
FIG. 5 shows template 201 after a second editing operation.
Figure 5:
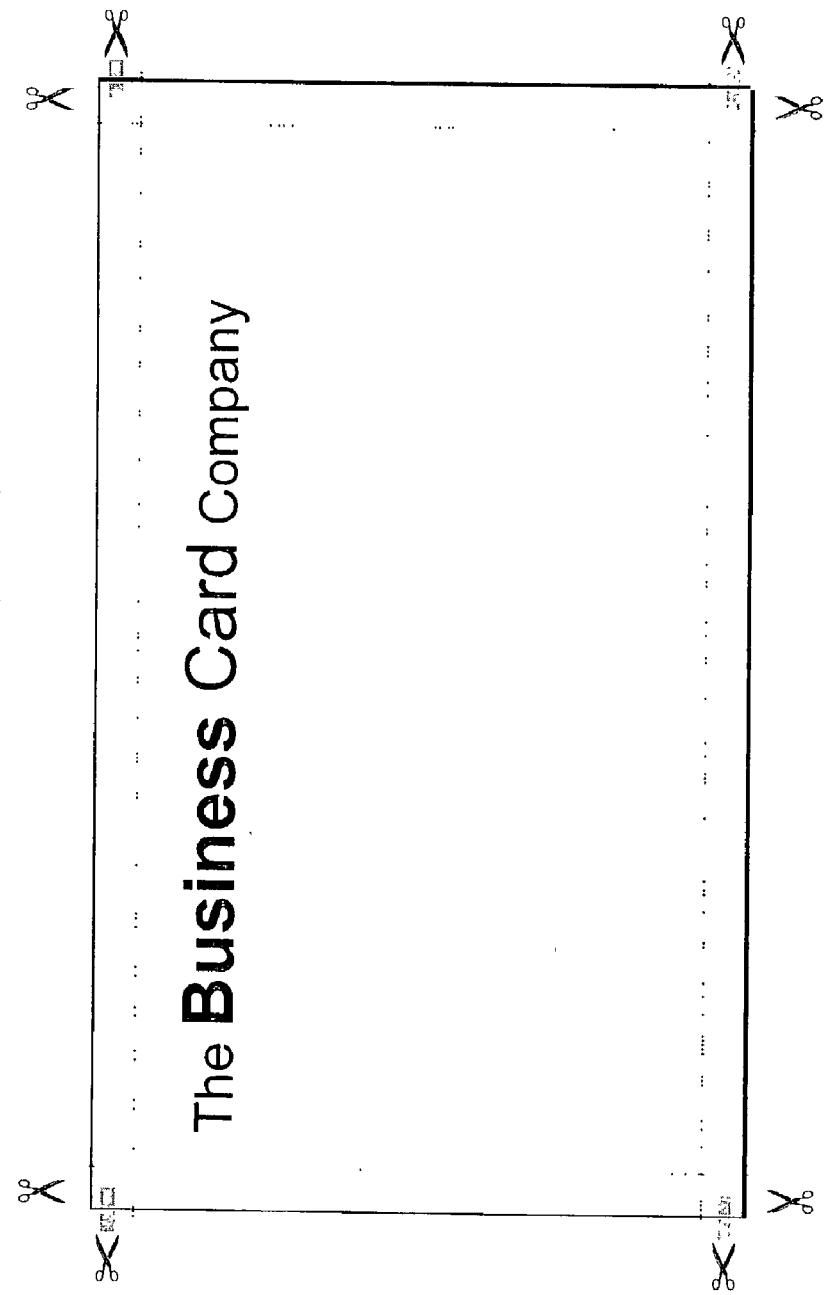

FIGS. 3-5 show an example of a series of text entries and edits made by a user to text element 209. For clarity and simplicity of presentation, the invention will be described in the context of a single DIV element. As will be readily understood from the following discussion, the principles of the invention can be applied to all text elements throughout the document.

In FIG. 3, the user has replaced the initial text in text area 209 with "The Business Card Company". As had been indicated to the user by the default settings displayed in Edit Bar 202 shown in FIG. 2, the words are rendered in 12 point Arial. The DIV element for the text element shown in FIG. 3 is now:

<DIV class=moveme id=text100 contentEditable=true style="DISPLAY: none; FONT-SIZE: 24 px; Z-INDEX: 22; LEFT: 35 px; COLOR: #000000; FONT-FAMILY: Arial; LETTER-SPACING: 0 px; POSITION: absolute; TOP: 35 px; WRITING-MODE: lr-tb">The Business Card Company</DIV>

The user can make modifications to the text string by entering or deleting characters or, using Edit Bar 202, can change the font type, size or color, or can add bolding or italics. Editing is done in the conventional manner of positioning the cursor at the location where editing is to begin and performing the desired operation, such as deleting existing characters, entering new characters, or highlighting one or more existing characters and making changes using Edit Bar 302.

For the purpose of this example, the user edits the text string to increase the font size of the words "Business Card" from 12 to 16 as shown in FIG. 4. These edits are processed as discussed below such that the resulting DIV element is:

<DIV class=moveme id=text100 contentEditable=true style="DISPLAY: none; FONT-SIZE: 24 px; Z-INDEX: 22; LEFT: 35 px; COLOR: #000000; FONT-FAMILY: Arial; LETTER-SPACING: 0 px; POSITION: absolute; TOP: 35 px; WRITING-MODE: lr-tb" vpdocitem="true">The<SPAN id=vpls_span_1 style="FONT-SIZE: 32 px">Business Card</SPAN>Company</DIV>

The edit is implemented by placing a SPAN element that specifies the particular edit inside the DIV element. The SPAN element is assigned a unique id. The initial edit is identified with id=vpls_span_1, where the 1 indicates that this is the first edit made.

In FIG. 5, the user has modified the text shown in FIG. 4 to make the word "Business" bold. The resulting DIV is:

<DIV class=moveme id=text100 contentEditable=true style="DISPLAY: none; FONT-SIZE: 24 px; Z-INDEX: 22; LEFT: 30 px; COLOR: #000000; FONT-FAMILY: Arial; LETTER-SPACING: 0 px; POSITION: absolute; TOP: 35 px; WRITING-MODE: lr-tb">The<SPAN id=vpls_span_1 style="FONT-SIZE: 32 px"><SPAN id=vpls_span_2 style="FONT-WEIGHT: bold">Business</SPAN>Card</SPAN>Company</DIV>

This edit operation creates a second SPAN element identified as id=vpls_span_2. The SPAN elements are appropriately arranged according to the portion of text that they affect. If additional edits were to be made, additional SPAN elements would be added as appropriate, each having a unique id.

As another example, the DIV element shown below would result from the following actions performed in the following sequence: open a new document, open a new textbox, replace initial instructive text with the characters "ABCD", change the font type for all characters to Tahoma, make all characters bold, put all characters in italics, increase the font size of all characters to 20 point, and select a new color for all characters:

<DIV class=moveme id=text100 contentEditable=true style="DISPLAY: none; FONT-SIZE: 24 px; Z-INDEX: 22; LEFT: 33 px; COLOR: #000000; FONT-FAMILY: Arial; LETTER-SPACING: 0 px; POSITION: absolute; TOP: 34 px; WRITING-MODE: lr-tb"vpdocitem="true"><SPAN id=vpls_span_1 style="FONT-FAMILY: Tahoma"><SPAN id=vpls_span_2 style="FONT-WEIGHT: bold"><SPAN id=vpls_span_3 style="FONT-STYLE: italic"><SPAN id=vpls_span_4 style="FONT-SIZE: 40 px"><SPAN id=vpls_span_5 style="COLOR: #00aeef">ABCD</SPAN></SPAN></SPAN></SPAN></SPAN></DIV>

Figure 6:
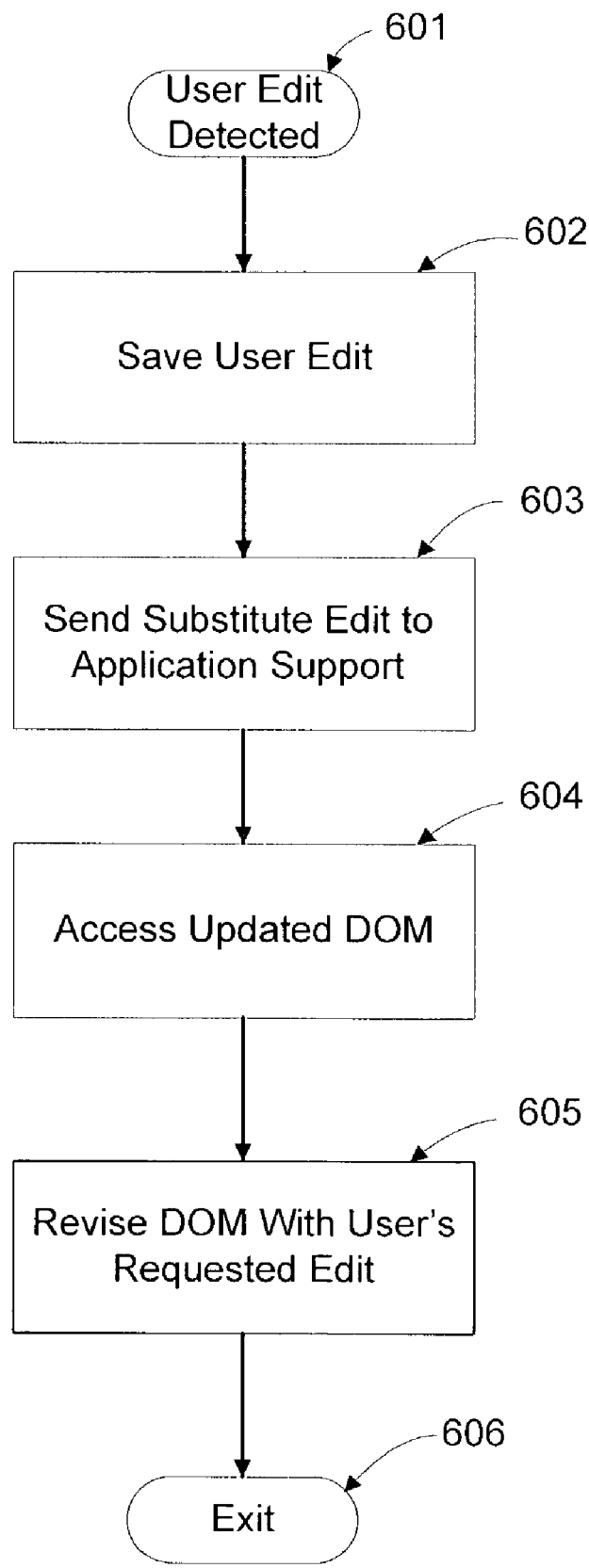
FIG. 6 shows a flow chart of the invention.

Turning to FIG. 6, a flow chart illustrating the invention is depicted. In a preferred embodiment, the invention is implemented as a function within Edit Tool 105 that is called when the user requests a modification to a character parameter using one of the font-related control fields of Edit Bar 202, such as Font Type Menu 203, Font Size Menu 204, Bold button 205, Italics button 206 or Color Menu 207. The user's use of the menu dropdown arrows associated with Font Type Menu 203, Font Size Menu 204 and Color Menu 207 do not call the function because they merely allow the user to survey possible selections and do not indicate that an action will actually be performed.

Edits to the text that do not change the existing DIV element parameters, such as inserting or deleting a character of the same font type, size and other attributes as the other characters in the element, do not involve Edit Bar 202 and are therefore are forwarded to and processed by Application Support 106 for processing without invoking the function.

To perform an edit using Edit Bar 202, the user will first use the cursor to highlight one or more characters in a text field to be affected by the edit. The user will then move the cursor to Edit Bar 202 and initiate the edit action. The edit action can be triggered either with a single action, such as by clicking on Italics button 206, or with a set of actions, such as by pulling down the menu of fonts, scrolling to locate a desired font, and clicking on the font name. When the triggering click by the user is detected at step 601, the actual edit requested by the user is saved at step 602 for use at step 604. At step 603, a standard predetermined substitute edit action is forwarded to Application Support 106 in place of the actual edit action requested by the user. In a preferred embodiment, the substitute action is a request that Application Support 106 render the character or characters selected by the user in the color gray identified as by the color code #cccccc. This specific color is of no particular significance and was chosen simply for convenience. Other colors, or other commands entirely, could readily be used for this purpose.

Application Support 106 will update the DOM to reflect the substitute edit request. In step 604, the updated DOM is accessed. The browser tag identifying font color=#cccccc is recognized as being a placeholder for the edit that was actually requested by the user. In step 605, the tags associated with the color change in the DIV element are replaced with a SPAN element containing the edit as actually requested by the user. For a very brief time between steps 603 and the completion of 605, the DOM will contain the result of the substitute edit, meaning the selected characters are render ed in gray, rather than the actual requested edit. However, the time elapsing between the initial rendering of the DOM resulting from step 603 and the revised rendering resulting from step 605 is so brief as to be imperceptible to the human eye under normal operation.

Using the above-described method, the invention can structure a DOM with appropriate pixel-based font size tags. Replacing all user edit requests with a single predetermined substitute request that will return a predetermined readily identifiable result is simpler and more efficient than forwarded the actual request and then trying to figure out exactly how that specific request would have caused the DOM to be modified. In addition, using the SPAN flag to denote all attribute changes within a DIV element simplifies the structure of the DOM and would be useful in identifying edited DIV elements in DOM analysis or further processing.

While the invention has been shown and described in one preferred embodiment, the described embodiment is to be considered as illustrative rather than restrictive. The invention is not restricted to XHTML but is applicable to any similar or future version of a markup language. Similarly, while the invention has been described in connection with the current DOM standard, the invention is not to be interpreted as being restricted to this standard, but can be applied to any similar type of structured document description standard whether referred to as a "DOM" or by another name. The scope of the invention is as indicated in the following claims and all equivalent methods and apparatus.

What is claimed is:

1. A method for editing a markup language document displayed by a browser executing in a computer system in response to a request from a user of the system to edit one or more characters in a text element of the document, the method comprising:
   creating a substitute edit request for the one or more characters that differs from the edit operation requested by the user,
   supplying the substitute edit request to the browser to cause the browser to revise the document in accordance with the substitute edit request,
   accessing the object model of the document after revision by the browser, and
   editing the revised object model to achieve the intent of the user edit request.

2. The method of claim 1 wherein the user edit request is a request to change a font parameter of the one or more characters.

3. The method of claim 2 wherein the user edit request is a request to change the font size.

4. The method of claim 1 wherein the substitute edit request is a request to render the one or more characters in a predetermined color.

5. The method of claim 1 wherein all user document edit requests are modified such that all substitute edit requests involve the same type of edit operation.

6. The method of claim 1 wherein editing the model includes identifying the at least one section of the revised model corresponding to the substitute edit request and replacing the at least one identified section with at least one different section corresponding to the document edit request.

7. A computer readable medium having embodied therein a program for editing a markup language document displayed by a browser executing in a computer system in response to a request from a user of the system to edit one or more characters in a text element of the document, the program comprising:
   program code operative to create a substitute edit request for the one or more characters that differs from the edit operation requested by the user,
   program code operative to supply the substitute edit request to the browser to cause the browser to revise the document in accordance with the substitute edit request,
   program code operative to access the object model of the document after revision by the browser, and
   program code operative to edit the revised model to achieve the intent of the user edit request.

8. A computer readable medium having embodied therein a document editing program configured to run in the browser of a computer system, the browser having the ability to generate an object model of a markup language document being edited and the computer system having a processor, a display device for displaying a document being edited to a user of the computer system, and a user data input device for supplying text and commands to the program, the medium comprising:
   program code for simultaneously displaying a markup language document, at least one text editing tool, and at least one text box such that the user can enter text to be displayed in the document,
   program code, responsive to a request from the user to edit one or more text characters in a text box, for supplying a substitute edit request for the one or more text characters that differs from the edit operation requested by the user to the browser to cause the browser to revise the document in accordance with the substitute edit request,
   program code for accessing the object model of the document after revision by the browser, and
   program code for editing the revised model to achieve the intent of the user edit request.

9. The medium of claim 7 wherein the user edit request is a request to change a font parameter of the one or more characters.

10. The medium of claim 7 wherein the substitute edit request is a request to render the one or more characters in a predetermined color.

11. The medium of claim 7 wherein all user document edit requests are modified such that all substitute edit requests involve the same type of edit operation.

12. The medium of claim 7 wherein program code for editing the revised model includes program code for identifying the at least one section of the revised model corresponding to the substitute edit request and replacing the at least one identified section with at least one different section corresponding to the document edit request.

13. The medium of claim 8 wherein the user edit request is a request to change a font parameter of the one or more characters.

14. The medium of claim 8 wherein the substitute edit request is a request to render the one or more characters in a predetermined color.

15. The medium of claim 8 wherein all user edit requests are modified such that all substitute edit requests involve the same type of edit operation.

16. The medium of claim 8 wherein the program code for editing the revised model includes program code for identifying the at least one section of the revised model corresponding to the substitute edit request and replacing the at least one identified section with at least one different section corresponding to the document edit request.

* * * * *